(12) United States Patent
Emsbach et al.

(10) Patent No.: US 12,729,021 B2
(45) Date of Patent: Sep. 8, 2026

(54) AERONAUTICAL OBSTACLE KNOWLEDGE NETWORK

(71) Applicant: The Boeing Company, Chicago, IL (US)

(72) Inventors: Theresa Emsbach, Schoellkrippen (DE); Michael J. Browne, Zurich (CH)

(73) Assignee: The Boeing Company, Arlington, VA (US)

( * ) Notice: Subject to any disclaimer, the term of this patent is extended or adjusted under 35 U.S.C. 154(b) by 525 days.

(21) Appl. No.: 17/936,155

(22) Filed: Sep. 28, 2022

(65) Prior Publication Data

US 2024/0103532 A1 Mar. 28, 2024

(51) Int. Cl.

| | |
|---|---|
| ***G05D 1/06*** | (2006.01) |
| ***B64C 39/02*** | (2023.01) |
| ***B64U 70/00*** | (2023.01) |
| ***G05D 1/00*** | (2006.01) |
| ***G05D 1/10*** | (2006.01) |
| ***G06T 7/70*** | (2017.01) |
| ***G06V 10/62*** | (2022.01) |
| ***G06V 10/764*** | (2022.01) |
| ***G06V 20/17*** | (2022.01) |
| ***G06V 20/64*** | (2022.01) |
| *B64U 101/30* | (2023.01) |

(52) U.S. Cl.

CPC ........... *B64U 70/00* (2023.01); *G05D 1/0676* (2013.01); *G05D 1/101* (2013.01); *G06T 7/70* (2017.01); *G06V 10/62* (2022.01); *G06V 10/764* (2022.01); *G06V 20/17* (2022.01); *G06V 20/64* (2022.01); *B64U 2101/30* (2023.01); *B64U 2201/10* (2023.01); *G06T 2207/10032* (2013.01)

(58) Field of Classification Search

None

See application file for complete search history.

(56) References Cited

U.S. PATENT DOCUMENTS 9,489,852 B1 * 11/2016 Chambers ............. B64C 39/024
10,049,589 B1 * 8/2018 Boyd ........................ G08G 5/32
2016/0093225 A1 * 3/2016 Williams ............. G06V 20/176 701/17

(Continued)

FOREIGN PATENT DOCUMENTS

WO WO-2011036661 A1 * 3/2011 ....... G08B 13/19604

*Primary Examiner* — Anne Marie Antonucci
*Assistant Examiner* — Kyle S Park
(74) *Attorney, Agent, or Firm* — Alleman Hall LLP

(57) ABSTRACT

A computing system receives sensor data that includes, for a reporting aeronautical vehicle of a set of one or more reporting aeronautical vehicles, one or more images captured by the reporting aeronautical vehicle. For the image of the sensor data, the computing system identifies one or more candidate landing zones within the image. For the candidate landing zone identified, the computing system estimates a geographic position of the candidate landing zone; and associates an identifier of the candidate landing zone with the geographic position. The computing system receives, from a client device, a request for a landing zone for an aeronautical vehicle. Responsive to the request, the computing system selects from among the one or more candidate landing zones, a target candidate landing zone; and sends the geographic position estimated for the target candidate landing zone to the client device.

20 Claims, 7 Drawing Sheets

(56) References Cited

U.S. PATENT DOCUMENTS

| | | | | |
|---|---|---|---|---|
| 2017/0045894 | A1* | 2/2017 | Canoy | G08G 5/55 |
| 2017/0069214 | A1* | 3/2017 | Dupray | G08G 5/56 |
| 2018/0114450 | A1* | 4/2018 | Glaab | B64U 70/00 |
| 2019/0002122 | A1* | 1/2019 | Ding | G08G 5/32 |
| 2019/0087635 | A1* | 3/2019 | Klaus | H04N 13/239 |
| 2019/0163206 | A1* | 5/2019 | Zhu | B64U 60/50 |
| 2019/0248487 | A1* | 8/2019 | Holtz | G06V 20/17 |
| 2020/0365041 | A1* | 11/2020 | Kasilya Sudarsan | G08G 5/25 |
| 2021/0264798 | A1* | 8/2021 | B | G08G 5/21 |
| 2023/0081722 | A1* | 3/2023 | Speranzon | B64C 39/024 701/3 |

* cited by examiner

110
AV 192
CLIENT DEVICE 190
NETWORK 180
COMPUTING SYSTEM 170
160
100
120
130
154
140
152
150

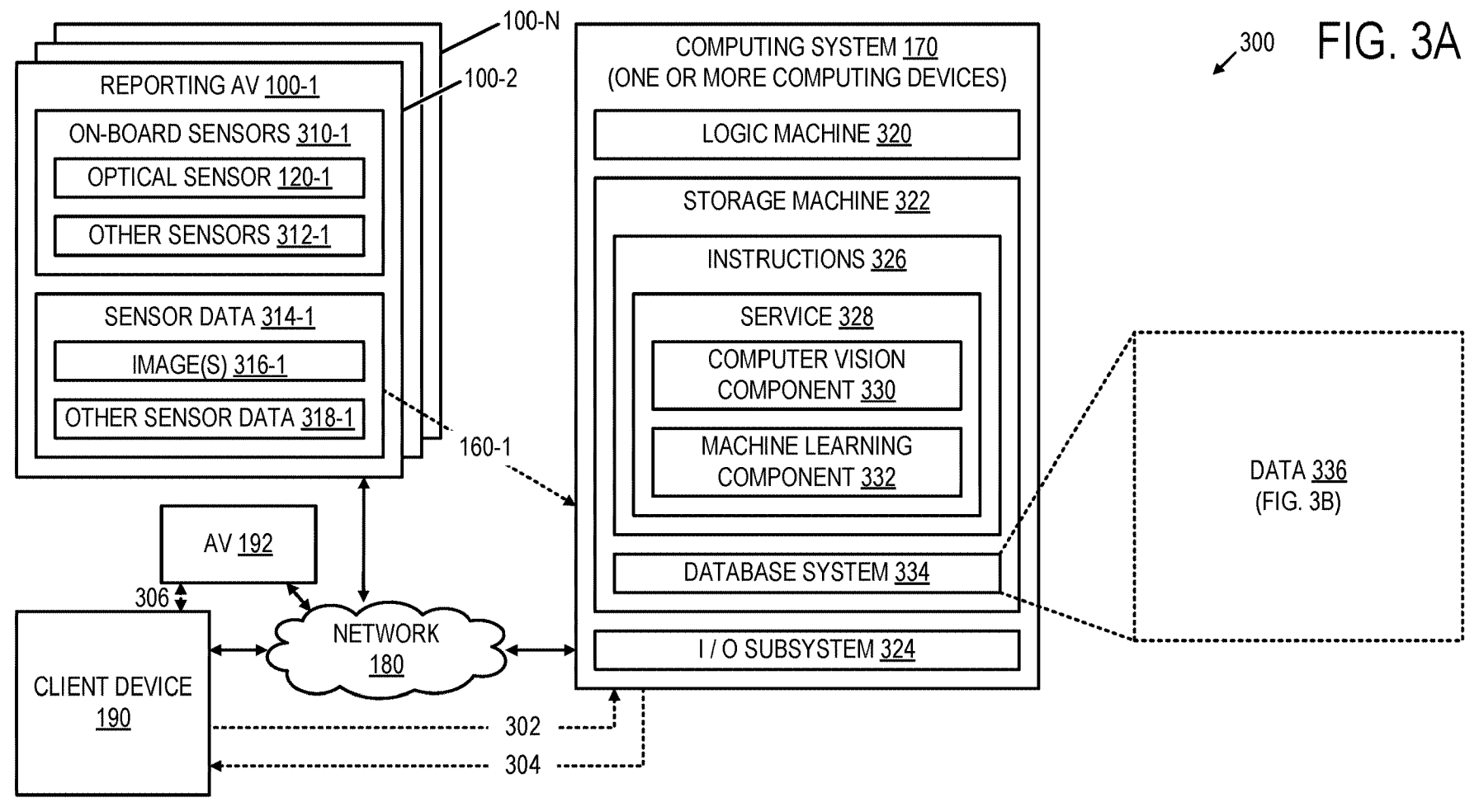

COMPUTING SYSTEM 170
(ONE OR MORE COMPUTING DEVICES)
LOGIC MACHINE 320
STORAGE MACHINE 322
INSTRUCTIONS 326
SERVICE 328
COMPUTER VISION COMPONENT 330
MACHINE LEARNING COMPONENT 332
DATABASE SYSTEM 334
I / O SUBSYSTEM 324

DATA 336
(FIG. 3B)

100-N
100-2
REPORTING AV 100-1
ON-BOARD SENSORS 310-1
OPTICAL SENSOR 120-1
OTHER SENSORS 312-1
SENSOR DATA 314-1
IMAGE(S) 316-1
OTHER SENSOR DATA 318-1

160-1

NETWORK 180

302
304

AV 192

306

CLIENT DEVICE 190

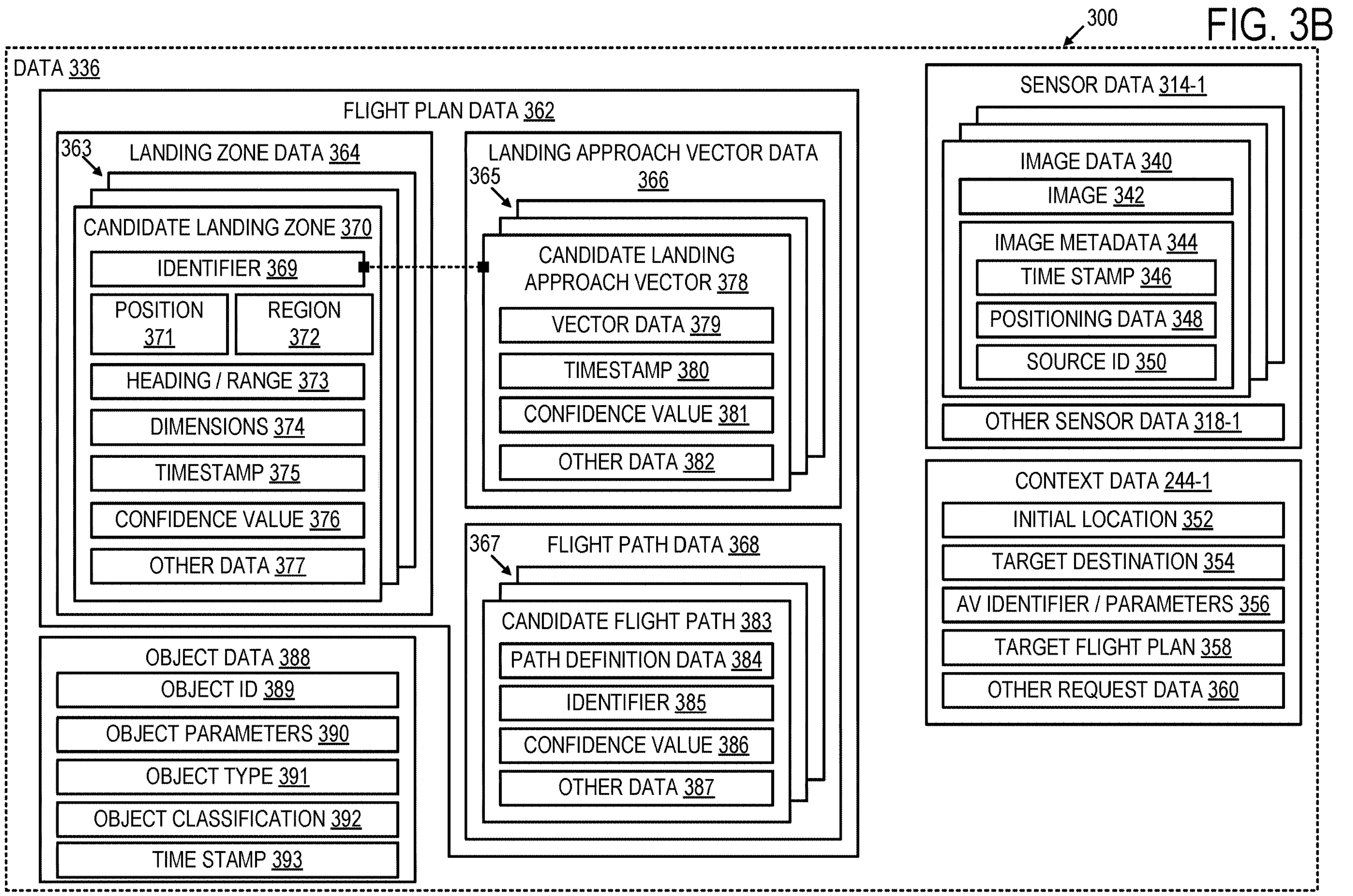
FIG. 3B
300
DATA 336
FLIGHT PLAN DATA 362
363
LANDING ZONE DATA 364
CANDIDATE LANDING ZONE 370
IDENTIFIER 369
POSITION 371
REGION 372
HEADING / RANGE 373
DIMENSIONS 374
TIMESTAMP 375
CONFIDENCE VALUE 376
OTHER DATA 377
LANDING APPROACH VECTOR DATA 366
365
CANDIDATE LANDING APPROACH VECTOR 378
VECTOR DATA 379
TIMESTAMP 380
CONFIDENCE VALUE 381
OTHER DATA 382
367
FLIGHT PATH DATA 368
CANDIDATE FLIGHT PATH 383
PATH DEFINITION DATA 384
IDENTIFIER 385
CONFIDENCE VALUE 386
OTHER DATA 387
OBJECT DATA 388
OBJECT ID 389
OBJECT PARAMETERS 390
OBJECT TYPE 391
OBJECT CLASSIFICATION 392
TIME STAMP 393
SENSOR DATA 314-1
IMAGE DATA 340
IMAGE 342
IMAGE METADATA 344
TIME STAMP 346
POSITIONING DATA 348
SOURCE ID 350
OTHER SENSOR DATA 318-1
CONTEXT DATA 244-1
INITIAL LOCATION 352
TARGET DESTINATION 354
AV IDENTIFIER / PARAMETERS 356
TARGET FLIGHT PLAN 358
OTHER REQUEST DATA 360

Figure 4:
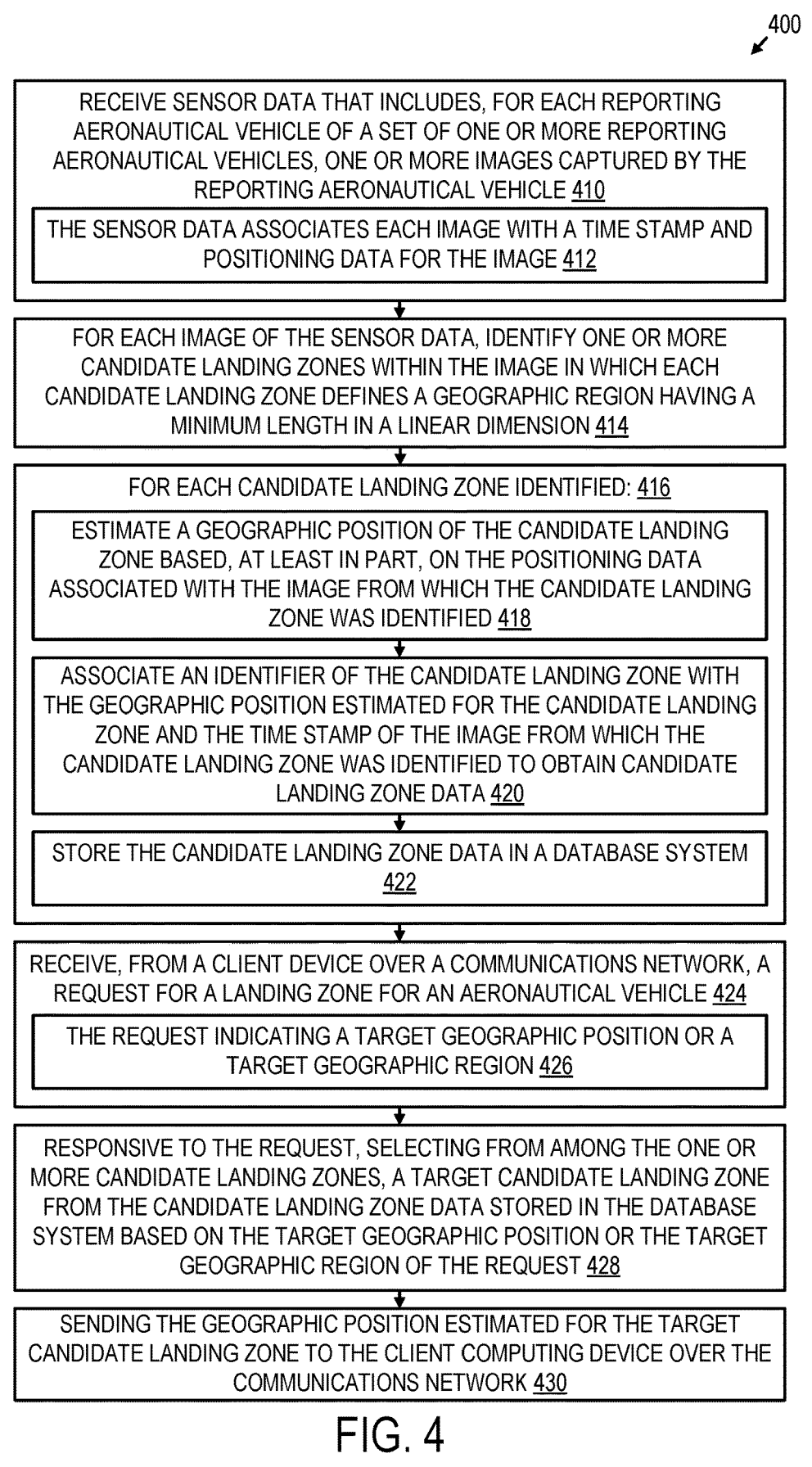

400

RECEIVE SENSOR DATA THAT INCLUDES, FOR EACH REPORTING AERONAUTICAL VEHICLE OF A SET OF ONE OR MORE REPORTING AERONAUTICAL VEHICLES, ONE OR MORE IMAGES CAPTURED BY THE REPORTING AERONAUTICAL VEHICLE 410

THE SENSOR DATA ASSOCIATES EACH IMAGE WITH A TIME STAMP AND POSITIONING DATA FOR THE IMAGE 412

FOR EACH IMAGE OF THE SENSOR DATA, IDENTIFY ONE OR MORE CANDIDATE LANDING ZONES WITHIN THE IMAGE IN WHICH EACH CANDIDATE LANDING ZONE DEFINES A GEOGRAPHIC REGION HAVING A MINIMUM LENGTH IN A LINEAR DIMENSION 414

FOR EACH CANDIDATE LANDING ZONE IDENTIFIED: 416

ESTIMATE A GEOGRAPHIC POSITION OF THE CANDIDATE LANDING ZONE BASED, AT LEAST IN PART, ON THE POSITIONING DATA ASSOCIATED WITH THE IMAGE FROM WHICH THE CANDIDATE LANDING ZONE WAS IDENTIFIED 418

ASSOCIATE AN IDENTIFIER OF THE CANDIDATE LANDING ZONE WITH THE GEOGRAPHIC POSITION ESTIMATED FOR THE CANDIDATE LANDING ZONE AND THE TIME STAMP OF THE IMAGE FROM WHICH THE CANDIDATE LANDING ZONE WAS IDENTIFIED TO OBTAIN CANDIDATE LANDING ZONE DATA 420

STORE THE CANDIDATE LANDING ZONE DATA IN A DATABASE SYSTEM 422

RECEIVE, FROM A CLIENT DEVICE OVER A COMMUNICATIONS NETWORK, A REQUEST FOR A LANDING ZONE FOR AN AERONAUTICAL VEHICLE 424

THE REQUEST INDICATING A TARGET GEOGRAPHIC POSITION OR A TARGET GEOGRAPHIC REGION 426

RESPONSIVE TO THE REQUEST, SELECTING FROM AMONG THE ONE OR MORE CANDIDATE LANDING ZONES, A TARGET CANDIDATE LANDING ZONE FROM THE CANDIDATE LANDING ZONE DATA STORED IN THE DATABASE SYSTEM BASED ON THE TARGET GEOGRAPHIC POSITION OR THE TARGET GEOGRAPHIC REGION OF THE REQUEST 428

SENDING THE GEOGRAPHIC POSITION ESTIMATED FOR THE TARGET CANDIDATE LANDING ZONE TO THE CLIENT COMPUTING DEVICE OVER THE COMMUNICATIONS NETWORK 430

Figures 5, 6:
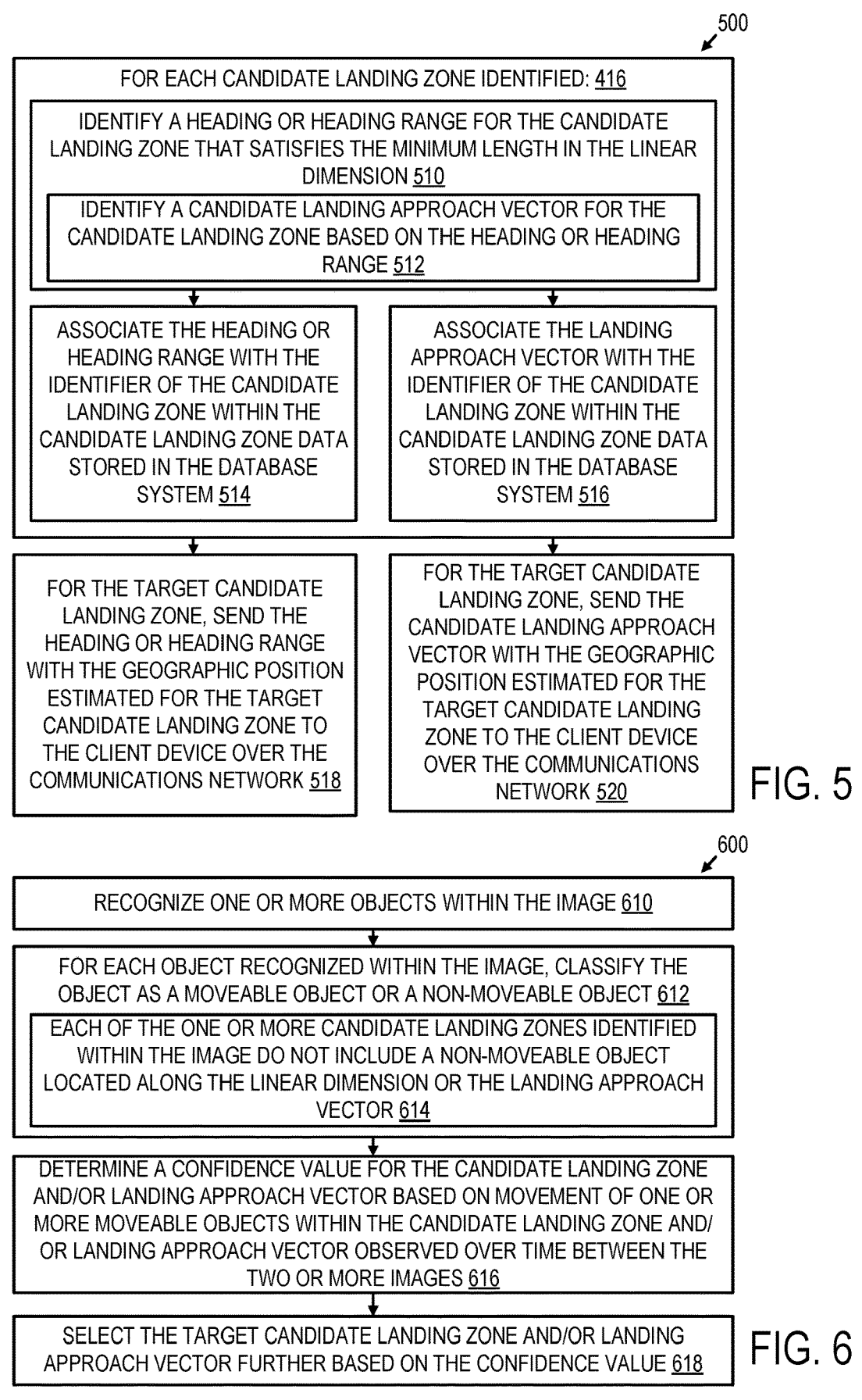

FOR EACH CANDIDATE LANDING ZONE IDENTIFIED: 416

IDENTIFY A HEADING OR HEADING RANGE FOR THE CANDIDATE LANDING ZONE THAT SATISFIES THE MINIMUM LENGTH IN THE LINEAR DIMENSION 510

IDENTIFY A CANDIDATE LANDING APPROACH VECTOR FOR THE CANDIDATE LANDING ZONE BASED ON THE HEADING OR HEADING RANGE 512

ASSOCIATE THE HEADING OR HEADING RANGE WITH THE IDENTIFIER OF THE CANDIDATE LANDING ZONE WITHIN THE CANDIDATE LANDING ZONE DATA STORED IN THE DATABASE SYSTEM 514

ASSOCIATE THE LANDING APPROACH VECTOR WITH THE IDENTIFIER OF THE CANDIDATE LANDING ZONE WITHIN THE CANDIDATE LANDING ZONE DATA STORED IN THE DATABASE SYSTEM 516

FOR THE TARGET CANDIDATE LANDING ZONE, SEND THE HEADING OR HEADING RANGE WITH THE GEOGRAPHIC POSITION ESTIMATED FOR THE TARGET CANDIDATE LANDING ZONE TO THE CLIENT DEVICE OVER THE COMMUNICATIONS NETWORK 518

FOR THE TARGET CANDIDATE LANDING ZONE, SEND THE CANDIDATE LANDING APPROACH VECTOR WITH THE GEOGRAPHIC POSITION ESTIMATED FOR THE TARGET CANDIDATE LANDING ZONE TO THE CLIENT DEVICE OVER THE COMMUNICATIONS NETWORK 520

RECOGNIZE ONE OR MORE OBJECTS WITHIN THE IMAGE 610

FOR EACH OBJECT RECOGNIZED WITHIN THE IMAGE, CLASSIFY THE OBJECT AS A MOVEABLE OBJECT OR A NON-MOVEABLE OBJECT 612

EACH OF THE ONE OR MORE CANDIDATE LANDING ZONES IDENTIFIED WITHIN THE IMAGE DO NOT INCLUDE A NON-MOVEABLE OBJECT LOCATED ALONG THE LINEAR DIMENSION OR THE LANDING APPROACH VECTOR 614

DETERMINE A CONFIDENCE VALUE FOR THE CANDIDATE LANDING ZONE AND/OR LANDING APPROACH VECTOR BASED ON MOVEMENT OF ONE OR MORE MOVEABLE OBJECTS WITHIN THE CANDIDATE LANDING ZONE AND/OR LANDING APPROACH VECTOR OBSERVED OVER TIME BETWEEN THE TWO OR MORE IMAGES 616

SELECT THE TARGET CANDIDATE LANDING ZONE AND/OR LANDING APPROACH VECTOR FURTHER BASED ON THE CONFIDENCE VALUE 618

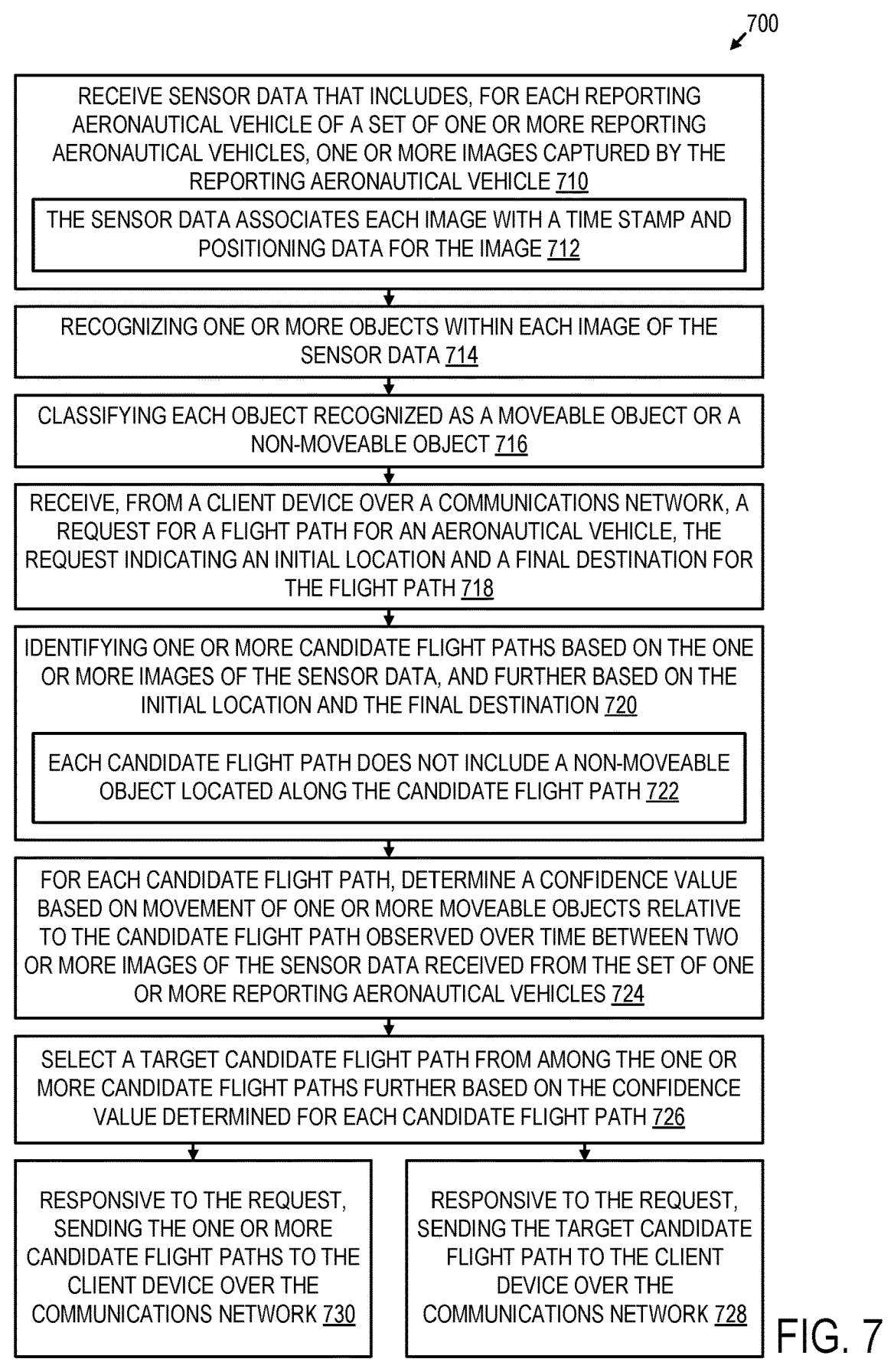

RECEIVE SENSOR DATA THAT INCLUDES, FOR EACH REPORTING AERONAUTICAL VEHICLE OF A SET OF ONE OR MORE REPORTING AERONAUTICAL VEHICLES, ONE OR MORE IMAGES CAPTURED BY THE REPORTING AERONAUTICAL VEHICLE 710

THE SENSOR DATA ASSOCIATES EACH IMAGE WITH A TIME STAMP AND POSITIONING DATA FOR THE IMAGE 712

RECOGNIZING ONE OR MORE OBJECTS WITHIN EACH IMAGE OF THE SENSOR DATA 714

CLASSIFYING EACH OBJECT RECOGNIZED AS A MOVEABLE OBJECT OR A NON-MOVEABLE OBJECT 716

RECEIVE, FROM A CLIENT DEVICE OVER A COMMUNICATIONS NETWORK, A REQUEST FOR A FLIGHT PATH FOR AN AERONAUTICAL VEHICLE, THE REQUEST INDICATING AN INITIAL LOCATION AND A FINAL DESTINATION FOR THE FLIGHT PATH 718

IDENTIFYING ONE OR MORE CANDIDATE FLIGHT PATHS BASED ON THE ONE OR MORE IMAGES OF THE SENSOR DATA, AND FURTHER BASED ON THE INITIAL LOCATION AND THE FINAL DESTINATION 720

EACH CANDIDATE FLIGHT PATH DOES NOT INCLUDE A NON-MOVEABLE OBJECT LOCATED ALONG THE CANDIDATE FLIGHT PATH 722

FOR EACH CANDIDATE FLIGHT PATH, DETERMINE A CONFIDENCE VALUE BASED ON MOVEMENT OF ONE OR MORE MOVEABLE OBJECTS RELATIVE TO THE CANDIDATE FLIGHT PATH OBSERVED OVER TIME BETWEEN TWO OR MORE IMAGES OF THE SENSOR DATA RECEIVED FROM THE SET OF ONE OR MORE REPORTING AERONAUTICAL VEHICLES 724

SELECT A TARGET CANDIDATE FLIGHT PATH FROM AMONG THE ONE OR MORE CANDIDATE FLIGHT PATHS FURTHER BASED ON THE CONFIDENCE VALUE DETERMINED FOR EACH CANDIDATE FLIGHT PATH 726

RESPONSIVE TO THE REQUEST, SENDING THE ONE OR MORE CANDIDATE FLIGHT PATHS TO THE CLIENT DEVICE OVER THE COMMUNICATIONS NETWORK 730

RESPONSIVE TO THE REQUEST, SENDING THE TARGET CANDIDATE FLIGHT PATH TO THE CLIENT DEVICE OVER THE COMMUNICATIONS NETWORK 728

FIG. 7

AERONAUTICAL OBSTACLE KNOWLEDGE NETWORK

FIELD

The subject matter of the present disclosure relates generally to flight planning based on sensor data obtained from a population of other aeronautical vehicles.

BACKGROUND

Operation of aeronautical vehicles typically involves flight planning. A flight plan can be defined by one or more of a flight path from an initial location to a target destination, a target landing zone within the vicinity of the target designation, and a target landing approach vector for the target landing zone. Flight planning can be used in both human controlled aeronautical vehicles and computer controlled autonomous aeronautical vehicles (AEVs).

SUMMARY

According to an example, a computing system receives sensor data that includes, for a reporting aeronautical vehicle of a set of one or more reporting aeronautical vehicles, one or more images captured by the reporting aeronautical vehicle. The sensor data associates the image with positioning data. For the image of the sensor data, the computing system identifies one or more candidate landing zones within the image in which the candidate landing zone defines a geographic region having a minimum length in a linear dimension. For the candidate landing zone identified, the computing system estimates a geographic position of the candidate landing zone based, at least in part, on the positioning data associated with the image from which the candidate landing zone was identified; associates an identifier of the candidate landing zone with the geographic position estimated for the candidate landing zone to obtain candidate landing zone data; and stores the candidate landing zone data in a database system. The computing system receives, from a client device over a communications network, a request for a landing zone for an aeronautical vehicle in which the request indicates a target geographic position or a target geographic region. Responsive to the request, the computing system selects from among the one or more candidate landing zones, a target candidate landing zone from the candidate landing zone data stored in the database system based on the target geographic position or the target geographic region of the request. The computing system sends the geographic position estimated for the target candidate landing zone to the client device over the communications network.

According to another example, a computing system receives sensor data that includes, for a reporting aeronautical vehicle of a set of one or more reporting aeronautical vehicles, one or more images captured by the reporting aeronautical vehicle. The sensor data associates the image with positioning data. The computing system receives, from a client device over a communications network, a request for a flight path for an aeronautical vehicle in which the request indicates an initial location and a target destination for the flight path. The computing system identifies one or more candidate flight paths based on the one or more images of the sensor data, and further based on the initial location and the target destination indicated by the request. Responsive to the request, the computing system sends the one or more candidate flight paths to the client device over the communications network.

BRIEF DESCRIPTION OF THE DRAWINGS

FIGS. 3A and 3B are schematic diagrams depicting an example computing environment.

FIG. 4 is a flow diagram depicting an example method for identifying candidate landing zones.

FIG. 5 is a flow diagram depicting an example method of associating a heading or heading range with a candidate landing zone.

FIG. 6 is a flow diagram depicting an example method of using computer vision to identify and classify objects captured within images received from reporting aeronautical vehicles.

FIG. 7 is a flow diagram depicting an example method for identifying candidate flight paths.

DETAILED DESCRIPTION

Operation of aeronautical vehicles typically involves flight planning. A flight plan can be defined by a flight path from an initial location to a target destination, a target landing zone within the vicinity of the target designation, and a target landing approach vector for the target landing zone. Flight planning can be used in both human controlled aeronautical vehicles and computer controlled autonomous aeronautical vehicles (AEVs). Some AEVs may be capable of performing flight planning or augmenting an existing flight plan in real-time or near-real-time based on sensor data captured by sensors on-board the AEV.

Various challenges associated with flight planning include changing conditions and navigating new or infrequently visited operating environments. Furthermore, within the context of AEVs, significant processing resources can be utilized to process sensor data on-board the vehicle that was captured by sensors on-board the AEV. For example, real-time or near-real-time processing of sensor data on-board AEVs may be performed to avoid or reduce impact with obstacles that are present within the operating environment, or to identify suitable landing zones among objects that are present within the operating environment. Urban environments and vegetation can pose particular challenges for AEVs due to the large quantity objects that are present within the operating environment, both moving and non-moving, as well as the spatial configuration of those objects.

The present disclosure has the potential to address these and other challenges associated with flight planning and operation of aeronautical vehicles (particularly AEVs) by leveraging sensor data captured by a population of other aeronautical vehicles. As an example, images captured by an on-board camera of each of a plurality of reporting aeronautical vehicles can be used to recognize and classify objects within an operational environment to enable selection of candidate landing zones, landing approach vectors, and flight paths. Contextual information provided by requesting client devices engaged in flight planning can be used to further select target candidate landing zones, landing approach vectors, and flight paths for a particular context (e.g., a particular aeronautical vehicle and associated operating parameters) from among a plurality of candidate landing zones, landing approach vectors, and flight paths. Changes to operational environments, such as movement of objects, can be observed over time as additional sensor data is received from reporting aeronautical vehicles. Candidate landing zones, landing approach vectors, and flight paths that are provided to aeronautical vehicles or their operators can serve as feedforward information that has the potential to improve response time, reduce computing resource usage, and avoid or reduce unintended impact events with objects present within an operational environment.

Figure 1:
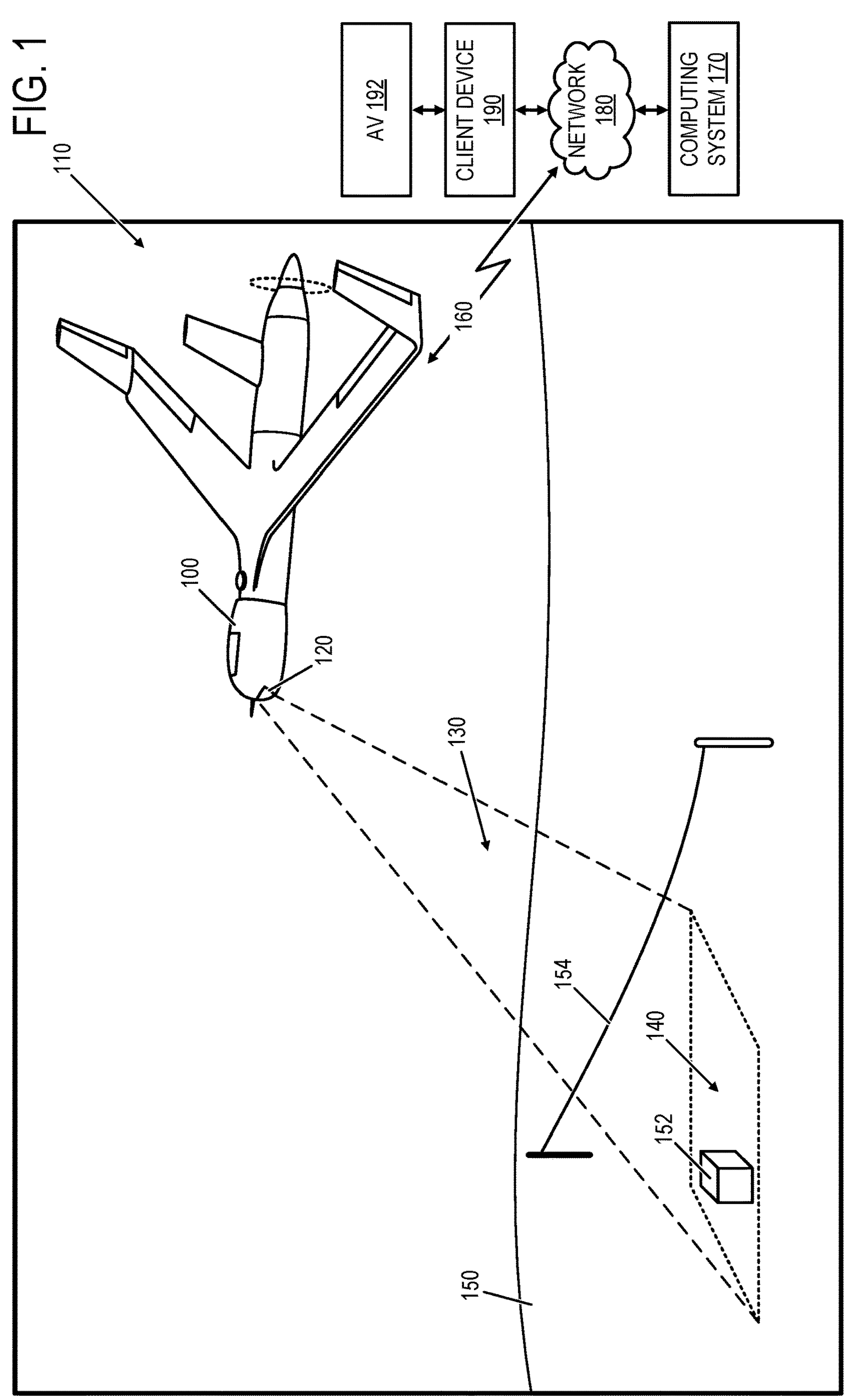
FIG. 1 depicts an aeronautical vehicle capturing sensor data within an operational environment via a set of one or more on-board sensors.

FIG. 1 depicts an aeronautical vehicle (AV) 100 capturing sensor data within an operational environment 110 via a set of one or more on-board sensors. In this example, the set of on-board sensors of AV 100 includes at least an optical sensor 120 (e.g., a camera or camera system) that captures images of operational environment 110 within a field of view along a flight path 130 and/or within a region 140 of terrestrial surface 150.

Operational environment 110, in this example, includes various objects 152, 154, etc., represented schematically in FIG. 1, that reside within region 140 and/or along flight path 130. Object 152 schematically represents an object residing within region 140 of terrestrial surface 150. Object 154 schematically represents an object that resides along flight path 130, such as a utility wire or bridge, as an example. Objects, such as example objects 152 and 154 can take the form of a non-moveable object (e.g., a stationary building structure) or a moveable object (e.g., a vehicle). Moveable objects can enter or leave operational environment 100 and can reside at different locations at different times within the operational environment, in contrast to non-moveable objects that reside at a stationary or fixed location within the operational environment.

Sensor data, including images or other optical sensor data (e.g., depth data, camera orientation data, times stamps, and other metadata, etc.) captured by AV 100, may be transmitted off-board AV 100 as depicted schematically at 160. Sensor data transmitted off-board AV 100, as indicated at 160, can be used to assist in flight planning for other aeronautical vehicles, including unmanned aerial vehicles (UAVs), as described in further detail herein. As an example, sensor data transmitted off-board AV 100, as indicated at 160, can be received by a computing system 170 via a communications network 180. Such sensor data can be processed by computing system 170 into various forms for use by a client device 190, such as a client computing device that is used to assist in flight planning for an aeronautical vehicle 192. Aeronautical vehicle 192 can take the form of a UAV, as an example.

Figure 2:
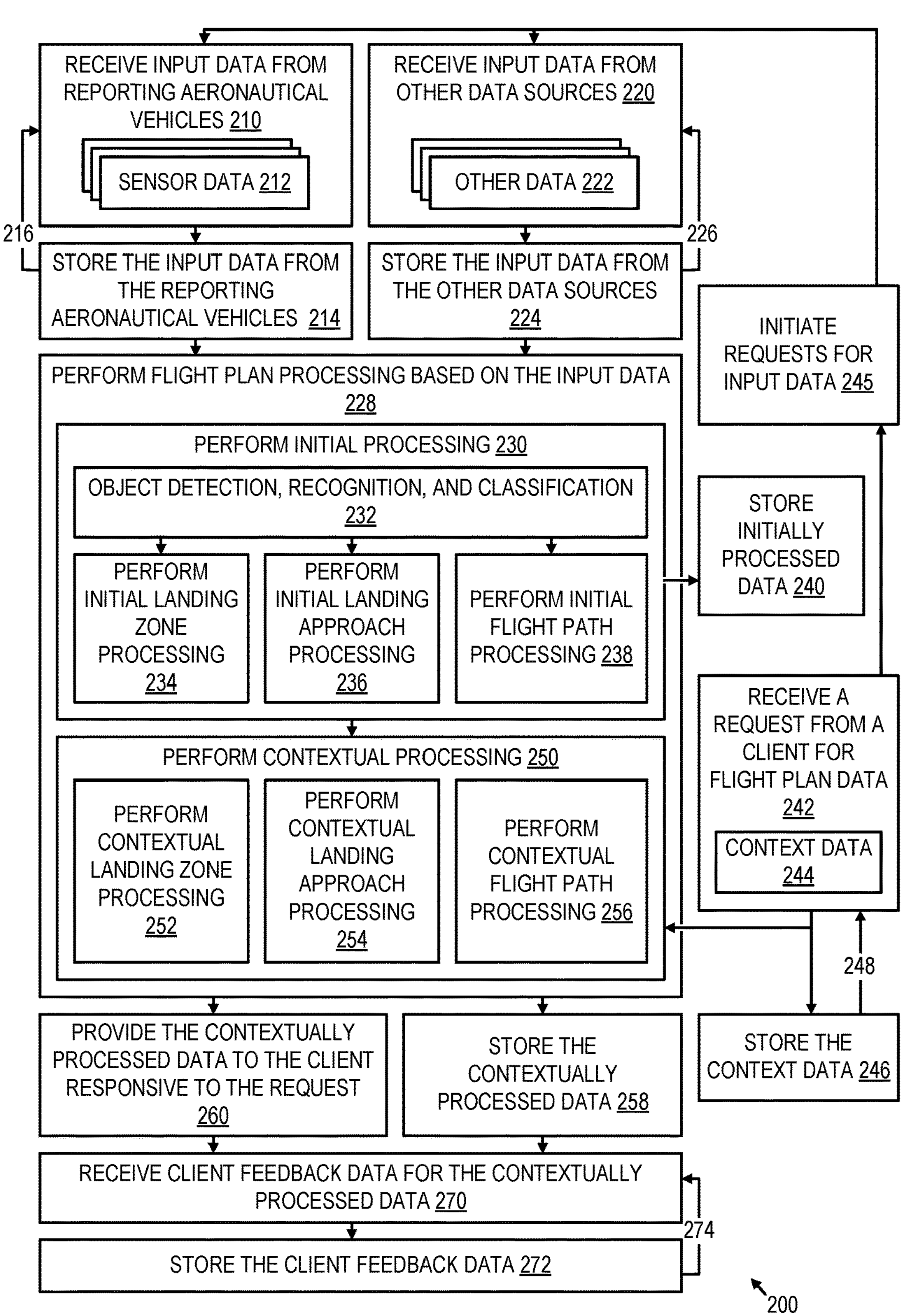
FIG. 2 is a flow diagram depicting an example method for processing sensor data reported by one or more aeronautical vehicles.

FIG. 2 is a flow diagram depicting an example method 200 for processing sensor data reported by one or more reporting aeronautical vehicles, such as sensor data captured and transmitted off-board by AV 100 of FIG. 1. As an example, method 200 or portions thereof can be performed by a computing system of one or more computing devices, such as computing system 170 of FIG. 1.

At 210, the method includes receiving input data (e.g., sensor data 212) from a set of one or more reporting aeronautical vehicles. The input data received at 210 can be reported by a population of many aeronautical vehicles over time that are distributed over a wide geographic region. As an example, the set of one or more aeronautical vehicles can include tens, hundreds, thousands, or more reporting aeronautical vehicles that reporting input data to the computing system at various respective times. While many reporting aeronautical vehicles are described in this example, it will be understood that each aeronautical vehicle, including an individual aeronautical vehicle can report input data (e.g., sensor data 212) to the computing system at different times and over multiple operational events spanning various geographic regions that are separated in time from each other.

Input data received at 210 can include sensor data 212 for each reporting event by each reporting aeronautical vehicle. Sensor data 212 can include images and/or other optical sensor data captured by an optical sensor (e.g., camera or camera system) of the aeronautical vehicle, as an example. For each reporting aeronautical vehicle of the set of one or more reporting aeronautical vehicles, the one or more images captured by the reporting aeronautical vehicle can include one or more of the following: (1) a visible light image or other wavelength range image captured by a visible light camera on-board the aeronautical vehicle, (2) a depth image captured by a depth camera on-board the aeronautical vehicle, (3) a LIDAR image captured by a LIDAR imaging system on-board the aeronautical vehicle, as examples. Images and/or other optical sensor data can be obtained as a series of images and/or other optical sensor data detection events. As an example, a plurality of images can form a video having multiple image frames captured by a reporting aeronautical vehicle.

Sensor data 212 can further include other forms of data, such as a positioning (e.g., position, heading, altitude, etc.) of the AV and/or its optical sensor, airspeed sensors/velocity, weather (e.g., pressure, air temperature, precipitation, etc.), among other suitable sensor data.

At 214, the method includes storing the input data received from the reporting aeronautical vehicles at 210, including sensor data 212. As an example, the input data can be stored in a database system of or accessible to the computing system that performs method 200. The receiving and storing of input data from reporting aeronautical vehicles can be performed each time such input data is reported to or otherwise made available from the reporting aeronautical vehicles, as indicated by return flow path 216.

At 220, the method includes receiving input data from one or more other data sources. Input data received at 220 can include various forms of other data 222 for each other source. Examples of other data 222 can include satellite imagery, various types of maps (e.g., street maps, building structure maps, elevation maps, topography maps, vegetation maps, etc.) machine learning training examples (e.g., training images of objects to be detected, recognized, and classified), weather data, etc. The other data sources from which input data including other data 222 is received can include computer network resources (e.g., websites), application programming interfaces (e.g., of a computer service), and uploaded and/or manually loaded data.

At 224, the method includes storing the input data received at 220, including other data 222. As an example, the input data can be stored in the database system accessible to the computing system that performs method 200. The receiving and storing of input data from other sources can be performed each time such input data is reported to or otherwise made available from the other sources, as indicated by return flow path 226.

At 228, the method includes performing flight plan processing based on the input data received at 210 and at 220. As an example, the input data can be retrieved or otherwise accessed from storage for processing following storing of the input data at 214 and 224.

As part of performing flight plan processing at 228, the method further includes, at 230, performing initial processing based on the input data received at 210 and at 220 to obtain initially processed data.

As an example, initial processing performed at 230 can include performing object detection, recognition, and/or classification at 232 for objects present within the images captured by the reporting aeronautical vehicles. As an example, the computing system performing method 200 can utilize computer vision to segment objects from images, recognize those objects, and classify those objects as moveable or non-moveable. For each object detected in the images processed as part of operation 232, the computing system can assign an object identifier to that object, along with positioning data that identifies a positioning of the object (e.g., based on positioning data accompanying the images received at 210 and/or other data received at 220 (e.g., maps)) within the operating environment in up to 6 degrees of freedom (e.g., X, Y, Z location, and roll, pitch, yaw orientation), as well as estimating the relative size and/or shape of those objects. Such information can be stored in association with the object identifier at operation 230, along with a timestamp identifying a time at which the image was captured. This timestamp can enable the computing system to determine the recency of the sensor data by which the object was detected, enabling the computing system to determine a confidence value for flight plan components. Object detection, recognition, and classification is described in further detail herein.

Initial processing performed at 230 can further include performing initial landing zone processing at 234 to identify one or more candidate landing zones, performing initial landing approach processing at 236 to identify one or more candidate landing approach vectors, and performing initial flight path processing at 238 to identify one or more candidate flight paths. As described in further detail herein, the computing system can identify candidate landing zones, landing approach vectors, and flight paths as components of a flight plan in a manner that avoids or reduces impact with objects detected, recognized, and classified at operation 232. For example, non-moveable objects can be avoided within or along the flight plan components proposed by the computing system, whereas moveable objects may be permitted to be within or along the flight plan components proposed by the computing system where a sufficient threshold in confidence value is achieved through observations of the operating environment over time.

At 240, the method includes storing the initially processed data obtained by performing initial processing at 230. As an example, the initially processed data can be stored in the database system accessible to the computing system that performs method 200. The initially processed data stored at 240 can be retrieved or otherwise accessed as part of subsequent processing tasks.

At 242, the method includes receiving a request from a client for flight plan data. The request can be received from the client via a communications network, such as network 180 of FIG. 1. As an example, the client can take the form of a client computing device that is being used for flight planning with respect to an aeronautical vehicle, such as a UAV. The request for flight plan data received at 242 can include various context data 244. Context data 244 can include data that identifies an initial location of an aeronautical vehicle, a target destination of the aeronautical vehicle, one or more waypoints between the initial location and the target destination, a target landing zone, a target landing approach vector, a target flight path, an identifier of the aeronautical vehicle, performance characteristics of the aeronautical vehicle (e.g., landing zone requirements), an identifier of the client, a current time of the request, a target time for initiating the flight plan at the aeronautical vehicle, and other suitable data. The request received at 242 can indicate (e.g., via context data 244) a particular form of flight plan data requested by the client, including one or more of landing zone data, landing approach data, and flight path data.

In at least some examples, responsive receiving the request at 242, including context data 244 from the client for flight plan data, the method can include initiating one or more requests to reporting aeronautical vehicles and/or other data sources based on the context data. In this example, input data received at 210 and 220 can be responsive to the requests initiated at 245. For example, input data can be requested by the computing system from reporting aeronautical vehicles located nearby or along a client-proposed flight path, landing zone, landing approach vector, and/or target destination indicated by context data 244 using requests initiated at 245, and the requested input data can be received at 210 as previously described. As another example, input data can be requested at 245 from other data sources for the client-proposed flight path, landing zone, landing approach vector, and/or target destination indicated by context data 244. In this manner, real-time or near-real-time input data can be obtained for the client in advance of a flight plan being enacted or completed.

At 246, the method includes storing the context data received at 242. As an example, the context data can be stored in the database system accessible to the computing system that performs method 200. Additional requests including respective context data can be received from the same client and other clients over time, as indicated by return flow path 248.

At 250, the method includes performing contextual processing responsive to the request received at 242, based on the context data 244 of the request and further based on the initially processed data obtained by performing initial processing at 230.

Contextual processing performed at 250 can include performing contextual landing zone processing at 252 to identify context-specific candidate landing zones responsive to the request received at 242, performing contextual landing approach processing at 254 to identify context-specific candidate landing approach vectors responsive to the request, and performing contextual flight path processing at 256 to identify context-specific candidate flight paths responsive to the request.

At 258, the method includes storing the contextually processed data obtained by performing contextual processing at 250. As an example, the contextually processed data can be stored in the database system accessible to the computing system that performs method 200. The contextually processed data stored at 258 can be retrieved or otherwise accessed as part of subsequent processing tasks.

At 260, the method includes providing the contextually processed data to the client responsive to the request. The contextually processed data can be provided to the client via a communications network, such as network 180 of FIG. 1. As an example, the contextually processed data provided to the client at 260 can include one or more target candidate landing zones selected for the client, based on context data 244, from among the candidate landing zones initially identified by performing initial processing at 230. As another example, the contextually processed data provided to the client at 260 can include one or more target candidate landing approach vectors selected for the client, based on context data 244, from among the candidate landing approach vectors initially identified by performing initial processing at 230. As yet another example, the contextually processed data provided to the client at 260 can include one or more target candidate flight paths selected for the client, based on context data 244, from among the candidate flight paths initially identified by performing initial processing at 230.

The client that obtains the contextually processed data that is responsive to the request received from the client at 242 can utilize such data in various ways for flight planning of the aeronautical vehicle indicated by the context data. In at least some examples, the client from which the request was received at 242 and served at 260 can include the aeronautical vehicle, such as a client computing device located on-board the aeronautical vehicle (e.g., a UAV). Alternatively or additionally, the client from which the request was received at 242 and served at 260 can include a client computing device that is remotely located from and off-board the aeronautical vehicle. In this example, the client computing device can send contextually processed data obtained at 260 (or portions thereof) to the aeronautical vehicle via a communications network.

At 270, the method includes receiving client feedback data for the contextually processed data that was provided at 260. As an example, the client feedback data can indicate whether one or more features of a flight plan such as a target candidate landing zone, target candidate landing approach vector, and/or target candidate flight path were provided to the aeronautical vehicle for implementation. Additionally or alternatively, the client feedback data can indicate whether such features of the flight plan were implemented (e.g., successfully or unsuccessfully) by the aeronautical vehicle, such as by landing or attempting to land at the target candidate landing zone using the target candidate landing vector, and/or by performing or attempting to perform the target candidate flight path.

At 272, the method includes storing the client feedback data. As an example, the client feedback data can be stored in the database system accessible to the computing system that performs method 200. The client feedback data stored at 272 can be retrieved or otherwise accessed as part of subsequent processing tasks.

Client feedback data received at 270 and/or stored at 272 can be used to perform initial processing at 230 and/or contextual processing at 250 for subsequent requests received as other instances of operation 242. In this example, client feedback data can take the form of other data 222 received at 220.

As an example, unsuccessful landing attempts using a target candidate landing zone and/or landing approach vector can inform (e.g., via negative weighting) selection of different or alternative candidate landing zones and/or landing approach vectors. Conversely, successful landing of the aeronautical vehicle using a target candidate landing zone and/or landing approach vector can inform reselection (e.g., via positive weighting) of the target candidate landing zone and/or landing approach vector for subsequent client requests.

As another example, unsuccessful flight path attempts and/or deviations therefrom using a target candidate flight path can inform (e.g., via negative weighting) selection of different or alternative candidate flight paths. Conversely, successful flight path navigation of the aeronautical vehicle using a target candidate flight path can inform reselection (e.g., via positive weighting) of the target candidate flight path for subsequent client requests.

In each of the above examples, client feedback data can be used to improve flight planning by enabling selection of target candidate landing zones, landing approach vectors, and flight paths that are more likely to result in successful implementation. Furthermore, as additional input data is received from reporting aeronautical vehicles at 210, initial processing can be again performed at 230 based on the additional input data to improve the selection of flight plan features, including candidate landing zones, landing approach vectors, and flight paths that are subsequently provided to requesting clients.

FIGS. 3A and 3B are schematic diagrams depicting an example computing environment 300 that includes computing system 170, communications network 180, client device 190, and AV 192 of FIG. 1, and further includes reporting AV 100-1, AV-100-2, through AV-100-N as example instances of reporting AV 100 of FIG. 1.

AV 100-1, AV 100-2 through AV 100-N refers to a plurality of reporting aeronautical vehicles, where N represents any suitable quantity of reporting aeronautical vehicles. AV 100-1, as an example, includes a set of one or more on-board sensors 310-1 that capture sensor data 314-1. Sensor data 314-1 is an example of sensor data 212 of FIG. 2. On-board sensors 310-1 of AV 100-1 include an optical sensor 120-1 (e.g., a camera) as an example of optical sensor 120 of FIG. 1. On-board sensors 310-1 of AV 100-1 can include one or more other sensors 312-1. As examples, other sensors 312-1 can include positioning sensors that identify a positioning of the AV and/or optical sensor 310-1, airspeed sensors, weather sensors, etc.

Sensor data 314-1 captured by on-board sensors 310-1, including at least optical sensor 120-1, includes one or more images 316-1. Images 316-1 can capture a field of view of the flight path of AV 100-1 and/or one or more regions of a terrestrial surface, such as previously described with reference to FIG. 1. Other sensor data 318-1 can be captured by AV 100-1 via other sensors 312-1. Sensor data 314-1 can be reported off-board reporting AV 100-1 to computing system 170, as indicated schematically at 160-1. As an example, sensor data 314-1 may be transmitted via communications network 180.

Computing system 170 is depicted in further detail in FIG. 3A as including a logic machine 320, a storage machine 322, and an input/output subsystem 324, which are described in further detail herein. Briefly, logic machine 320 can execute instructions 326 stored in storage machine 322 to perform the methods and operations described herein. As an example, storage machine 322 includes instructions 326 stored thereon that are executable by logic machine 320 to perform method 200 of FIG. 2.

In this example, instructions 326 define a service 328 by which reporting AVs (e.g., 100-1, 100-2 through 100-N) can report sensor data to computing system 170, and by which client devices (e.g., 190) can request flight plan data from the computing system. For example, method 200 of FIG. 2 can be implemented by service 328.

Within FIG. 3A, client device 190 sends a request 302 to computing system 170 via communications network 180, and receives a response 304 from the computing system via communication network 180. Response 304 can include flight planning data, which can include data that identifies and/or defines one or more candidate landing zones, one or more candidate landing approach vectors, and one or more candidate flight paths that are selected or otherwise identified by computing system 170 based on context data (e.g., 244 of FIG. 2) that accompanies request 302.

While AV 192 is depicted as a separate entity from client device 190, it will be understood that AV 192 can be client device 190 that sends request 302 and receives response 304. Alternatively, client device 190 can provide flight planning data, including flight planning data accompanying response 304 to AV 192 as indicated schematically at 306. Interaction between client device 190 and AV 192 can include exchange of data via communications network 180, and/or can include exchange of data over a direct data link or connection, depending on implementation. Client device 190 can take the form of a computing device that executes a flight planning application used to set a flight plan for AV 192, such as in the case of a UAV.

Service 328 of computing system 170 is depicted in FIG. 2 including a computer vision component 330 and a machine learning component 322. Computer vision component 330 can be implemented by computing system 170 to process images (e.g., 316-1) received from reporting AVs. As an example, computer vision component 330 can be used to perform object detection, recognition, and classification of operation 232 of FIG. 2. Machine learning component 332 can be implemented by computing system 170 to process sensor data (e.g., 314-1) including other sensor data 318-1, and previously described input data received at 210 and 220 of FIG. 2 as part of flight plan processing performed at 228 of FIG. 2. As an example, machine learning component 332 can be used, in combination with computer vision component 330, to perform object detection, recognition, and classification of operation 232 of FIG. 2. As another example, machine learning component 332 can be used to perform tasks associated with processing performed at operations 234, 236, 238, 252, 254, and 256 of FIG. 2.

Storage machine 322 further includes other data 336 stored thereon, which can form part of a database system 334. Storage operations previously described at 214, 224, 240, 246, and 272 of FIG. 2 can include database system 334 as a suitable data storage resource. Examples of data 336 are depicted schematically in FIG. 3B.

Input/output subsystem 324 can include any suitable quantity and configuration of input devices and output devices over which computing system 170 can receive or send data. Examples of input/output subsystem 324 are described in further detail herein.

FIG. 3B schematically depicts example data 336 that can be stored within database system 334 as part of performing method 200 of FIG. 2. Within FIG. 3B, an example of sensor data 314-1 that is received and stored by computing system 170 from reporting AV 100-1 is depicted in further detail. Sensor data 314-1 includes image data 340 for an image 342 captured by AV 100-1. Image 342 represents an example image of images 316-1 of FIG. 3A. Image data 340 associates image 342 with image metadata 344, which can include a time stamp 346 identifying a time at which image 342 was captured, positioning data 348 identifying a positioning of an optical sensor that captured image 342, and a source identifier 350 that identifies a source of the captured image, such as an identifier of AV-100. Sensor data 314-1 further includes other sensor data 318-1, as previously described with reference to FIG. 3A.

FIG. 3B further depicts example context data 244-1 as an example instance of context data 244 of FIG. 2 that can accompany a request from a client device, such as request 302 received from client device 190 of FIG. 3A. Context data 244-1 can include one or more of an initial location 352 of AV 192, a target destination 354 for AV 192 (e.g., a target geographic location and/or a target geographic region), an identifier and/or operating parameters 356 for AV 192, a target flight plan 358 for AV 192, and other request data 360. Target flight plan 358 can identify one or more target landing zones, one or more target landing approach vectors, and/or one or more target flight paths, as examples. These target flight plan components can be used by computing system 170 to select or otherwise propose one or more target candidate flight plan components, such as a target candidate landing zone, a target candidate landing approach vector, and a target candidate flight path that are free of obstacles or have a confidence value that exceeds a threshold with respect to the avoidance of moveable objects.

FIG. 3B further depicts example flight plan data 362 that can be generated by computing system 170 by performing method 200 of FIG. 2, including landing zone data 364, landing approach vector data 366, and flight path data 368, as examples.

Landing zone data 364 can include a set of one or more candidate landing zones 363 (e.g., a plurality of candidate landing zones) identified by computing system 170 of which candidate landing zone 370 is an example. Candidate landing zone 370, for example, can include data describing the candidate landing zone, including an identifier 369 of the candidate landing zone, a geographic position 371 of the candidate landing zone, a geographic region 372 defined by the candidate landing zone, a heading and/or heading range 373 of the candidate landing zone, spatial dimensions 374 of the candidate landing zone, a timestamp 375 identifying recency of one or more images that captured the candidate landing zone, a confidence value 376 as to the availability or suitability of the candidate landing zone, and other data 377.

Each candidate landing zone can be associated with a set of one or more candidate landing approach vectors 365 (e.g., a plurality of candidate landing approach vectors) within data 336 that forms landing approach vector data 366. As an example, candidate landing zone 370 is associated with candidate landing approach vector 378 (e.g., via identifier 369). As described with reference to candidate landing approach vector 378, each candidate landing approach vector can include vector data 379 that defines the orientation of the landing approach vector within the operating environment, a timestamp 380 that identifies a recency of one or more images that captured the candidate landing zone, a confidence value 381 as to the availability or suitability of the candidate landing approach vector, and other data 382.

Flight path data 368 can include a set of one or more candidate flight paths 367 (e.g., a plurality of candidate flight paths) within data 336. As described with reference to candidate flight path 383, each candidate flight path can include flight path definition data 384 that identifies a starting location, an end destination, and one or more waypoints for the candidate flight path, an identifier 385 of the candidate flight path, a timestamp 386 that identifies a recency of one or more images that captured the candidate flight path or a portion thereof, a confidence value 386 as to the availability or suitability of the candidate flight path, and other data 387.

Data 336 can further include object data for each object detected at operation 232 of FIG. 2. As an example, for an object, object data 388 can include an object identifier 389, object parameters 390 (e.g., a positioning, size, shape, etc. of the object), an object type 391 (e.g., based on object recognition), object classification 392 (e.g., moveable or non-moveable), and a timestamp 393 that identifies a recency of one or more images that captured the object or a portion thereof.

FIG. 4 is a flow diagram depicting an example method 400 for identifying a target candidate landing zone. Method 400 is an example implementation of method 200 of FIG. 2 with respect to providing a target candidate landing zone to a client device. Method 400 can be performed by a computing system, such as example computing system 170 of FIGS. 1, 3A, and 3B.

At 410, the method includes receiving sensor data that includes, for each reporting aeronautical vehicle of a set of one or more reporting aeronautical vehicles, one or more images captured by the reporting aeronautical vehicle. As indicated at 412, the sensor data received at 410 associates each image with a time stamp and positioning data for the image.

At 414, for each image of the sensor data, the method includes identifying one or more candidate landing zones within the image in which each candidate landing zone defines a geographic region having a minimum length in a linear dimension.

At 416, for each candidate landing zone identified, the method includes operations 418, 420, and 422.

At 418, the method includes estimating a geographic position of the candidate landing zone based, at least in part, on the positioning data associated with the image from which the candidate landing zone was identified.

At 420, the method includes associating an identifier of the candidate landing zone with the geographic position estimated for the candidate landing zone and the time stamp of the image from which the candidate landing zone was identified to obtain candidate landing zone data.

At 422, the method includes storing the candidate landing zone data in a database system.

At 424, the method includes receiving, from a client device over a communications network, a request for a landing zone for an aeronautical vehicle. As indicated at 426, the request indicates a target geographic position or a target geographic region.

At 428, the method includes responsive to the request, selecting from among the one or more candidate landing zones, a target candidate landing zone from the candidate landing zone data stored in the database system based on the target geographic position or the target geographic region of the request.

At 430, the method includes sending the geographic position estimated for the target candidate landing zone to the client device over the communications network.

In at least some implementations, a heading or a heading range can be associated with each candidate landing zone that is identified at operation 416 of method 400. This heading or heading range can be provided to a requesting client device with the geographic position estimated for the target candidate landing zone to assist in flight planning. As an example, a UAV can obtain and use the heading or heading range to assist with identifying a landing approach vector for landing at the target candidate landing zone.

FIG. 5 is a flow diagram depicting an example method 500 of associating a heading or heading range with a candidate landing zone as part of operation 416 of FIG. 4. As an example, method 500 can be performed by the computing system (e.g., computing system 170 of FIGS. 1 and 3A) that performs method 400 of FIG. 4.

At 510, the method includes identifying a heading or a heading range for the candidate landing zone that satisfies the minimum length in the linear dimension. As an example, the heading can be orientated parallel to the longest linear dimension of the candidate landing zone. As another example, the heading range can include a range of headings that satisfy the minimum length in the linear dimension.

At 512, the method can further include identifying a candidate landing approach vector for the candidate landing zone based on the heading or heading range identified at 510. As an example, the landing approach vector can be identified as being colinear with the heading or an inverse orientation of the heading, or as a vector within the heading range or an inverse orientation within the heading range. In at least some implementations, the directionality of the candidate landing approach vector can be based on a location of objects (e.g., a height of objects) present at or near boundaries of a region that defines the candidate landing zone. For example, the directionality of the candidate landing approach vector can be identified such that objects located at or near a forward edge of the candidate landing zone have a lower height than objects located at or near a rearward edge of the candidate landing zone.

At 514, the method includes associating the heading or heading range with the identifier of the candidate landing zone within the candidate landing zone data stored in the database system at 422 of FIG. 4. For a given candidate landing zone, the computing system can access the heading or heading range associated with the candidate landing zone, along with the geographic position associated with the candidate landing zone at 420 of FIG. 4.

At 516, the method includes associating the candidate landing approach vector with the identifier of the candidate landing zone within the candidate landing zone data stored in the database system at 422 of FIG. 4. For a given candidate landing zone, the computing system can access the candidate landing approach vector associated with the candidate landing zone, along with the geographic position associated with the candidate landing zone at 420 of FIG. 4. Thus, as an example, context data 244 that accompanies the request received at 242 of FIG. 2 can identify a target landing zone for which a candidate landing approach vector is to be identified or retrieved by the computing system for the requesting client device. In this example, the target candidate landing zone selected at 428 of FIG. 4 includes the target landing zone indicated by the request.

At 518, the method includes for the target candidate landing zone selected at 428 of FIG. 4, sending the heading or heading range with the geographic position estimated for the target candidate landing zone to the client device over the communications network. As an example, the heading or heading range can be sent with the geographic position estimated for the target candidate landing zone at 430 of FIG. 4.

At 520, the method includes for the target candidate landing zone selected at 428 of FIG. 4, sending the candidate landing approach vector as a selected target candidate landing approach vector with the geographic position estimated for the target candidate landing zone to the client device over the communications network. As an example, the target candidate landing approach vector can be sent with the geographic position estimated for the target candidate landing zone at 430 of FIG. 4.

In at least some implementations, computer vision can be used to recognize and classify objects captured within images received from reporting AVs. As an example, objects can be classified as moveable or non-moveable, which can be used to determine a confidence value associated with a candidate landing zone. The confidence value can inform selection of target candidate landing zones and/or the confidence value can be provided to requesting client devices to enable selection or prioritization of a landing zone from among two or more target candidate landing zones.

FIG. 6 is a flow diagram depicting an example method 600 of using computer vision to identify and classify objects captured within images received from reporting AVs. As an example, method 600 can be performed by the computing system (e.g., computing system 170 of FIGS. 1 and 3A) that performs method 400 of FIG. 4. Furthermore, method 600 can form part of performing flight plan processing at operation 228 of FIG. 2. The computing system, for example, can execute computer vision component 330 of FIG. 3A as part of performing method 600.

As part of operation 414 of FIG. 4, for each image of the sensor data, to identify the one or more candidate landing zones within the image, the method further includes performing operations 610 and 612 of FIG. 6.

At 610, the method includes recognizing one or more objects within the image. As an example, the computing system executing computer vision component 330 of FIG. 3A is used to perform operation 610. In at least some examples, the computing system attempts to recognize each object within the image.

At 612, the method includes for each object recognized within the image, classifying the object as a moveable object or a non-moveable object. As an example, the computer vision component executed by the computing system or a database system (e.g., database system 334) accessible to the computing system includes object classification data that associates each object with an identifier of either moveable or non-moveable. The computing system can reference this association to classify objects as part of operation 612.

As indicated at 614, each of the one or more candidate landing zones identified within the image, at 414 of FIG. 4, does not include a non-moveable object located along the linear dimension or along the candidate landing approach vector for the candidate landing zone. In this example, the classification of an object as moveable or non-moveable can inform the selection of candidate landing zones at operation 414 of FIG. 4. In at least some examples, objects that are classified as moveable that are located along the linear dimension within the image can be treated by the computing system as having a likelihood of being present, and thus can enable the computing system to identify candidate landing zones that contain objects classified as moveable along the linear dimension. This approach can be beneficial for identifying candidate landing zones in urban environments or other environments in which suitable landing zones are otherwise scarce. UAVs, for example, can use candidate landing zones that contain moveable objects within previously captured images to determine whether those moveable objects are no longer present prior to attempting to land at those candidate landing zones.

At 616, the method includes, for two or more images of the sensor data received at 410 that each capture the geographic region of a candidate landing zone of the one or more candidate landing zones, determining a confidence value for the candidate landing zone based on movement of one or more moveable objects within the candidate landing zone observed over time between the two or more images. As an example, a first reporting AV can capture the candidate landing zone at a first time in which the candidate landing zone contains a moveable object, and a second reporting AV can capture the candidate landing zone at a second time in which the candidate landing zone does not contain the moveable object. The two or more images can be captured by the same aeronautical vehicle or by two or more different aeronautical vehicles.

Additionally or alternatively at 616, the method includes, for two or more images of the sensor data received at 410 that each capture a landing approach vector for the one or more candidate landing zones, determining a confidence value for the landing approach vector based on movement of one or more moveable objects within or along the landing approach vector observed over time between the two or more images. The two or more images can be captured by the same aeronautical vehicle or by two or more different aeronautical vehicles.

The confidence value determined for the candidate landing zone and/or landing approach vector can indicate a higher likelihood of availability or suitability for landing in response to observation of the moveable object not being present within the landing zone. This confidence value can be adjusted responsive to additional images of the landing zone and/or landing approach vector observed over time, as received from reporting AVs. For example, the confidence value determined at 616 can be increased to indicate an even higher likelihood of availability or suitability for landing in response to additional observations of the moveable object not being present within the landing zone or along the landing approach vector. Conversely, the confidence value determined at 616 can be decreased to indicate a lower likelihood of availability or suitability for landing in response to additional observations of the moveable object being present within the landing zone or along the landing approach vector.

In the above examples, the likelihood of availability or suitability for landing can be based on a quantity of observations in which the landing zone or landing approach vector does not contain moveable objects along the linear dimension of the landing zone or along the landing approach vector as compared to a total quantity of observations. Furthermore, the likelihood of availability or suitability for landing can be based on a weighting that is defined by a recency of each observation. For example, more recent observations can be assigned a greater weighting than less recent observations to determine a confidence value at 616 of FIG. 6.

At 618, the method includes selecting the target candidate landing zone at operation 428 of FIG. 4 further based, at least in part, on the confidence value determined for the target candidate landing zone. As an example, candidate landing zones having a higher confidence value indicative of a greater likelihood of availability or suitability for landing can be weighted for selection over candidate landing zones having a lower confidence value. It will be understood that other factors can be considered when selecting the target candidate landing zone, including proximity to a target destination, as indicated by context data 244 of FIG. 2 indicated by the client request.

FIG. 7 is a flow diagram depicting an example method 700 for identifying candidate flight paths. Method 700 is an example implementation of method 200 of FIG. 2 with respect to providing a target candidate flight path to a client device. Method 700 can be performed by a computing system, such as computing system 170 of FIG. 1 and FIG. 3A, as an example.

At 710, the method includes receiving sensor data that includes, for each reporting aeronautical vehicle of a set of one or more reporting aeronautical vehicles, one or more images captured by the reporting aeronautical vehicle. As indicated at 712, the sensor data associates each image with a time stamp and positioning data for the image.

At 714, the method includes recognizing one or more objects (if present) within each image of the sensor data. At 716, the method includes classifying each object recognized as a moveable object or a non-moveable object.

At 718, the method includes receiving, from a client device over a communications network, a request for a flight path for an aeronautical vehicle. As an example, the request can indicate an initial location and a target destination for the flight path.

At 720, the method includes identifying one or more candidate flight paths based on the one or more images of the sensor data, and further based on the initial location and the target destination. As indicated at 722, each candidate flight path does not include a non-moveable object located along the candidate flight path.

At 724, the method includes for each candidate flight path, determining a confidence value based on movement of one or more moveable objects relative to the candidate flight path observed over time between two or more images of the sensor data received from the set of one or more reporting aeronautical vehicles.

At 726, the method includes selecting a target candidate flight from among the one or more candidate flight paths based on the confidence value determined for each candidate flight path. As an example, candidate flight paths having a higher confidence value indicating availability or suitability of the candidate flight path can be selected over other candidate flight paths with lower confidence values. This approach can reduce the likelihood that an object, particularly a non-moveable object is located along a candidate flight path provided to the client device.

At 728, the method includes responsive to the request, sending the target candidate flight path to the client device over the communications network. Additionally or alternatively, at 730, the method includes responsive to the request, sending the one or more candidate flight paths to the client device over the communications network, enabling the client device or user thereof to select a flight path from among the candidate flight paths.

In at least some implementations, the methods and operations described herein are performed by a computing system of one or more computing devices. Such methods and operations may be implemented as a computer-application program or service (e.g., service 328 of FIG. 3A), an application-programming interface (API), a library, and/or other computer-program product, as examples.

FIGS. 3A and 3B, as previously described, schematically depict an example computing system 170 that can perform the methods and operations described herein. It will be understood that computing system 170 is shown in simplified form. Computing system 170 can take the form of one or more personal computers, server computers, tablet computers, network computing devices, gaming devices, mobile mobile communication devices (e.g., smart phone), and/or other computing devices.

Computing system 170, as previously described, includes a logic machine 320, a storage machine 322, and an input/output subsystem 324. Input/output subsystem 324 can include or interface with one or more input devices (e.g., user input devices such as a keyboard, mouse, controller, microphone, camera, etc.), output devices (e.g., graphical display, audio speaker, etc.), communication devices (e.g., wired and/or wireless communications equipment), and/or other components.

Logic machine 320 includes one or more physical devices configured to execute instructions (e.g., instructions 326). For example, the logic machine may be configured to execute instructions that are part of one or more applications, services (e.g., service 328), programs, routines, libraries, objects, components, data structures, or other logical constructs. Such instructions may be implemented to perform a task, implement a data type, transform the state of one or more components, achieve a technical effect, or otherwise arrive at a desired result. The logic machine can include one or more processors configured to execute software instructions. Additionally or alternatively, the logic machine can include one or more hardware or firmware logic machines configured to execute hardware or firmware instructions. Processors of the logic machine can be single-core or multi-core, and the instructions executed thereon can be configured for sequential, parallel, and/or distributed processing. Individual components of the logic machine can be distributed among two or more separate devices, which may be remotely located and/or configured for coordinated processing. Aspects of the logic machine can be virtualized and executed by remotely accessible, networked computing devices configured in a cloud-computing configuration.

Storage machine 322 includes one or more physical devices configured to hold instructions executable by the logic machine to implement the methods and operations described herein. When such methods and operations are implemented, the state of storage machine 322 may be transformed—e.g., to hold different data. Storage machine 322 can include removable and/or built-in devices. Storage machine 322 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 322 can include volatile, nonvolatile, dynamic, static, read/write, read-only, random-access, sequential-access, location-addressable, file-addressable, and/or content-addressable devices.

It will be understood that storage machine 320 includes one or more physical devices. However, aspects of the instructions (e.g., instructions 326) described herein alternatively may be propagated by a communication medium (e.g., an electromagnetic signal, an optical signal, etc.) that is not held by a physical device for a finite duration.

Aspects of logic machine 320 and storage machine 322 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine", as well as components 330 and 332 can be used to describe an aspect of computing system 170 implemented to perform a particular function. In some cases, a module, program, engine, or other component can be instantiated via logic machine 320 executing instructions 326 held by storage machine 322. It will be understood that different modules, programs, engines, or other components may be instantiated from the same application, service, code block, object, library, routine, API, function, etc. Likewise, the same module, program, engine, and/or component may be instantiated by different applications, services, code blocks, objects, routines, APIs, functions, etc. The terms "module," "program," "engine", or other component can encompass individual or groups of executable files, data files, libraries, drivers, scripts, database records, etc.

It will be appreciated that a "service", as used herein, is an application program executable across multiple user sessions. A service can be available to one or more system components, programs, and/or other services. In at least some implementations, a service (e.g., service 328) can run on one or more server-computing devices.

When included, a graphical display can be used to present a visual representation of data held by storage machine 322. This visual representation may take the form of a graphical user interface (GUI). As the herein described methods and processes change the data held by the storage machine, and thus transform the state of the storage machine, the state of graphical display may likewise be transformed to visually represent changes in the underlying data. A graphical display can include one or more display devices utilizing virtually any type of technology. Such display devices may be combined with logic machine 320 and/or storage machine 322 in a shared enclosure, or such display devices can be peripheral display devices.

Input/output subsystem 324 can be configured to communicatively couple computing system 170 with one or more other computing devices, such as client device 190, reporting AVs, and other AVs that consume and use flight plan data generated by computing system 170. Input/output subsystem 324 can include wired and/or wireless communication devices compatible with one or more different communication protocols. As illustrative examples, the input/output subsystem can be configured for communication via a wireless telephone network, or a wired or wireless local- or wide-area network. In some examples, the input/output subsystem enables computing system 170 to send and/or receive messages to and/or from other devices via a network (e.g., network 180) such as the Internet.

Examples of the subject matter of the present disclosure are described in the following enumerated paragraphs.

A.1. A method performed by a computing system comprises: receiving sensor data that includes, for a reporting aeronautical vehicle of a set of one or more reporting aeronautical vehicles, one or more images captured by the reporting aeronautical vehicle, wherein the sensor data associates the image with positioning data; for the image of the sensor data, identifying one or more candidate landing zones within the image in which the candidate landing zone defines a geographic region having a minimum length in a linear dimension; for the candidate landing zone identified: estimating a geographic position of the candidate landing zone based, at least in part, on the positioning data associated with the image from which the candidate landing zone was identified; associating an identifier of the candidate landing zone with the geographic position estimated for the candidate landing zone to obtain candidate landing zone data; and storing the candidate landing zone data in a database system; receiving, from a client device over a communications network, a request for a landing zone for an aeronautical vehicle, the request indicating a target geographic position or a target geographic region; responsive to the request, selecting from among the one or more candidate landing zones, a target candidate landing zone from the candidate landing zone data stored in the database system based on the target geographic position or the target geographic region of the request; and sending the geographic position estimated for the target candidate landing zone to the client device over the communications network.

A.2. The method of paragraph A.1, further comprising: for the candidate landing zone identified: identifying a heading for the candidate landing zone that satisfies the minimum length in the linear dimension; and associating the heading with the identifier of the candidate landing zone within the candidate landing zone data stored in the database system; and for the target candidate landing zone, sending the heading with the geographic position estimated for the target candidate landing zone to the client device over the communications network.

A.3. The method of any of paragraphs A.1-A.2, wherein for the image of the sensor data, to identify the one or more candidate landing zones within the image, the method further comprises: recognizing one or more objects within the image; and for the object recognized within the image classifying the object as a moveable object or a non-moveable object; wherein the one or more candidate landing zones identified within the image do not include a non-moveable object located along the linear dimension.

A.4. The method of paragraph A.3, wherein for two or more images of the sensor data that capture the geographic region of a candidate landing zone of the one or more candidate landing zones, the method further comprises: determining a confidence value for the candidate landing zone based on movement of one or more moveable objects within the candidate landing zone observed over time between the two or more images.

A.5. The method of paragraph A.4, wherein the target candidate landing zone is selected based, at least in part, on the confidence value determined for the target candidate landing zone.

A.6. The method of any of paragraphs A.1-A.5, further comprising: for the candidate landing zone identified: identifying a candidate landing approach vector; and associating the candidate landing approach vector with the identifier of the candidate landing zone within the candidate landing zone data stored in the database system; and for the target candidate landing zone, sending the candidate landing approach vector with the geographic position estimated for the target candidate landing zone to the client device over the communications network.

A.7. The method of paragraph A.6, wherein to identify the candidate landing approach vector for the candidate landing zone identified, the method further comprises: recognizing one or more objects within an image of the sensor data; and for the object recognized within the image: classifying the object as a moveable object or a non-moveable object; wherein the candidate landing approach vector identified does not include a non-moveable object located along the candidate landing approach vector.

A.8. The method of paragraph A.7, wherein for two or more images of the sensor data that capture the candidate landing approach vector, the method further comprises: determining a confidence value for the candidate landing approach vector based on movement of one or more moveable objects relative to the candidate landing approach vector observed over time between the two or more images.

A.9. The method of any of paragraphs A.1-A.8, wherein the target candidate landing zone is selected based, at least in part, on a proximity of the geographic position estimated for the target candidate landing zone to the target geographic position or the target geographic region.

A.10. The method of any of paragraphs A.1-A.9, wherein for the reporting aeronautical vehicle of the set of one or more reporting aeronautical vehicles, the sensor data includes one or more of the following: (1) a position of the reporting aeronautical vehicle, (2) a heading of the reporting aeronautical vehicle, (3) an altitude of the reporting aeronautical vehicle, (4) a velocity of the reporting aeronautical vehicle, (5) a weather condition measured by a sensor on-board the reporting aeronautical vehicle.

A.11. The method of any of paragraphs A.1-A.10, wherein for the reporting aeronautical vehicle of the set of one or more reporting aeronautical vehicles, the one or more images captured by the reporting aeronautical vehicle include one or more of the following: (1) a visible light image captured by a visible light camera on-board the reporting aeronautical vehicle, (2) a depth image captured by a depth camera on-board the reporting aeronautical vehicle, (3) a LIDAR image captured by a LIDAR imaging system on-board the reporting aeronautical vehicle.

B.1. A computing system, comprising: one or more computing devices that include a logic machine and a storage machine, wherein the storage machine includes instructions executable by the logic machine to: receive sensor data that includes, for a reporting aeronautical vehicle of a set of one or more reporting aeronautical vehicles, one or more images captured by the reporting aeronautical vehicle, wherein the sensor data associates the image with positioning data; for the image of the sensor data, identify one or more candidate landing zones within the image in which the candidate landing zone defines a geographic region having a minimum length in a linear dimension; for the candidate landing zone identified: estimate a geographic position of the candidate landing zone based, at least in part, on the positioning data associated with the image from which the candidate landing zone was identified; associate an identifier of the candidate landing zone with the geographic position estimated for the candidate landing zone to obtain candidate landing zone data; and store the candidate landing zone data in a database system of the storage machine; receive, from a client device over a communications network, a request for a landing zone for an aeronautical vehicle, the request indicating a target geographic position or a target geographic region; responsive to the request, select from among the one or more candidate landing zones, a target candidate landing zone from the candidate landing zone data stored in the database system based on the target geographic position or the target geographic region of the request; and send the geographic position estimated for the target candidate landing zone to the client device over the communications network.

B.2. The computing system of paragraph B.1, wherein the instructions are further executable by the logic machine to: for the candidate landing zone identified: identify a heading for the candidate landing zone that satisfies the minimum length in the linear dimension; and associate the heading with the identifier of the candidate landing zone within the candidate landing zone data stored in the database system; and for the target candidate landing zone, send the heading with the geographic position estimated for the target candidate landing zone to the client device over the communications network.

B.3. The computing system of any of paragraphs B.1-B.2, wherein the instructions are further executable by the logic machine to: identify the one or more candidate landing zones within the image by: recognizing one or more objects within the image; and for the object recognized within the image classifying the object as a moveable object or a non-moveable object; wherein the one or more candidate landing zones identified within the image do not include a non-moveable object located along the linear dimension.

B.4. The computing system of paragraph B.3, wherein for two or more images of the sensor data that capture the geographic region of a candidate landing zone of the one or more candidate landing zones; and wherein the instructions are further executable by the logic machine to: determine a confidence value for the candidate landing zone based on movement of one or more moveable objects within the candidate landing zone observed over time between the two or more images.

B.5. The computing system of paragraph B.4, wherein the instructions are further executable by the logic machine to select the target candidate landing zone based, at least in part, on the confidence value determined for the target candidate landing zone.

B.6. The computing system of any of paragraphs B.1-B.5, wherein the instructions are further executable by the logic machine to: for the candidate landing zone identified: identify a candidate landing approach vector; and associate the candidate landing approach vector with the identifier of the candidate landing zone within the candidate landing zone data stored in the database system; and for the target candidate landing zone, send the candidate landing approach vector with the geographic position estimated for the target candidate landing zone to the client device over the communications network.

C.1. A method performed by a computing system comprising: receiving sensor data that includes, for a reporting aeronautical vehicle of a set of one or more reporting aeronautical vehicles, one or more images captured by the reporting aeronautical vehicle, wherein the sensor data associates the image with positioning data; receiving, from a client device over a communications network, a request for a flight path for an aeronautical vehicle, the request indicating an initial location and a target destination for the flight path; identifying one or more candidate flight paths based on the one or more images of the sensor data, and further based on the initial location and the target destination; and responsive to the request, sending the one or more candidate flight paths to the client device over the communications network.

C.2. The method of paragraph C.1, wherein the one or more candidate flight paths sent to the client device is a target candidate flight path selected from among the one or more of the candidate flight paths; and wherein the method further comprises: recognizing one or more objects within the image of the sensor data; and classifying the object recognized as a moveable object or a non-moveable object; wherein the target candidate flight path selected does not include a non-moveable object located along the target candidate flight path.

C.3. The method of paragraph C.2., further comprising: for the candidate flight path, determining a confidence value based on movement of one or more moveable objects relative to the candidate flight path observed over time between two or more images of the sensor data received from the set of one or more reporting aeronautical vehicles; and wherein the target candidate flight path is selected from among the one or more candidate flight paths further based on the confidence value determined for the candidate flight path.

It will be understood that the configurations and/or approaches described herein are exemplary in nature, and that these specific examples or implementations are not to be considered in a limiting sense, because numerous variations are possible. The specific methods and flow diagrams described herein may represent one or more of any number of processing strategies. As such, various acts illustrated and/or described may be performed in the sequence illustrated and/or described, in other sequences, in parallel, or omitted. Likewise, the order of the above-described operations may be changed.

The subject matter of the present disclosure includes all novel and non-obvious combinations and sub-combinations of the various methods, operations, systems and configurations, and other features, functions, acts, and/or properties disclosed herein, as well as any and all equivalents thereof.

The invention claimed is:

1. A method performed by a computing system, the method comprising:
- receiving sensor data that includes a plurality of images captured by a plurality of reporting aeronautical vehicles over time, wherein the sensor data associates the plurality of images with positioning data;
- recognizing and classifying one or more objects within the plurality of images by a computer vision component of executed instructions in which each object recognized within the plurality of images is classified as a moveable object or a non-moveable object;
- identifying two or more candidate landing zones within the plurality of images in which each candidate landing zone defines a geographic region having a minimum length in a linear dimension that does not include one or more non-moveable objects located along the linear dimension;
- determining a confidence value for each candidate landing zone based on movement of one or more moveable objects within the candidate landing zone observed over time between two or more images of the plurality of images;
- for each candidate landing zone identified:
  - estimating a geographic position of the candidate landing zone based, at least in part, on the positioning data associated with images of the plurality of images from which the candidate landing zone was identified;
  - associating an identifier of the candidate landing zone with the geographic position estimated for the candidate landing zone and the confidence value to obtain candidate landing zone data; and
  - storing the candidate landing zone data in a database system;
- receiving, from a client computing device located on-board an unmanned aerial vehicle (UAV) over a wireless communications network, a request for a landing zone for the UAV, the request indicating a target geographic position or a target geographic region;
- responsive to the request, selecting from among the two or more candidate landing zones, a target candidate landing zone from the candidate landing zone data stored in the database system based on the target geographic position or the target geographic region of the request; and
- sending flight planning data that includes the geographic position estimated for the target candidate landing zone and the confidence value associated with the target candidate landing zone to the client computing device over the wireless communications network,
- wherein the client computing device executes a flight planning application that sets a flight plan for the UAV, based at least in part, on the geographic position and the confidence value of the flight planning data.

2. The method of claim 1, further comprising:
- for each candidate landing zone identified:
  - identifying a heading for the candidate landing zone that satisfies the minimum length in the linear dimension; and
  - associating the heading with the identifier of the candidate landing zone within the candidate landing zone data stored in the database system; and
- for the target candidate landing zone, sending the heading of the target candidate landing zone with the geographic position estimated for the target candidate landing zone to the client computing device over the wireless communications network.

3. The method of claim 1, wherein the target candidate landing zone is selected at the computing system based, at least in part, on the confidence value determined for the target candidate landing zone.

4. The method of claim 1, further comprising:
- for each candidate landing zone identified:
  - identifying a candidate landing approach vector; and
  - associating the candidate landing approach vector with the identifier of the candidate landing zone within the candidate landing zone data stored in the database system; and
- for the target candidate landing zone, sending the candidate landing approach vector of the target candidate landing zone with the geographic position estimated for the target candidate landing zone to the client computing device over the wireless communications network.

5. The method of claim 4, wherein the candidate landing approach vector that is identified for each candidate landing zone does not include a non-moveable object located along the candidate landing approach vector.

6. The method of claim 1, wherein the target candidate landing zone is selected based, at least in part, on a proximity of the geographic position estimated for the target candidate landing zone to the target geographic position or the target geographic region.

7. The method of claim 1, wherein for each reporting aeronautical vehicle of the plurality of reporting aeronautical vehicles, the sensor data includes a position of the reporting aeronautical vehicle.

8. The method of claim 7, wherein for each reporting aeronautical vehicle of the plurality of reporting aeronautical vehicles, the sensor data further includes one or more of a heading of the reporting aeronautical vehicle, an altitude of the reporting aeronautical vehicle, a velocity of the reporting aeronautical vehicle.

9. The method of claim 7, wherein for each reporting aeronautical vehicle of the plurality of reporting aeronautical vehicles, the sensor data further includes a weather condition measured by a sensor on-board the reporting aeronautical vehicle.

10. The method of claim 1, wherein for each reporting aeronautical vehicle of the plurality of reporting aeronautical vehicles, an image of the plurality of images captured by the reporting aeronautical vehicle include one or more of the following: (1) a visible light image captured by a visible light camera on-board the reporting aeronautical vehicle, (2) a depth image captured by a depth camera on-board the reporting aeronautical vehicle, (3) a LIDAR image captured by a LIDAR imaging system on-board the reporting aeronautical vehicle.

11. The method of claim 1, wherein the computing system prioritizes the target candidate landing zone from among two or more other candidate landing zones based on the confidence value.

12. The method of claim 1, wherein the target candidate landing zone has a higher confidence value indicative of a greater likelihood of availability or suitability for landing that is weighted for selection over other candidate landing zones of the two or more candidate landing zones having a lower confidence value.

13. A computing system, comprising:

one or more computing devices that include a logic machine and a storage machine, wherein the storage machine includes instructions executable by the logic machine to:

receive sensor data that includes a plurality of images captured by a plurality of reporting aeronautical vehicles, wherein the sensor data associates the plurality of images with positioning data;

recognize and classify one or more objects within the plurality of images by a computer vision component of executed instructions in which each object recognized within the plurality of images is classified as a moveable object or a non-moveable object;

identify two or more candidate landing zones within the plurality of images in which each candidate landing zone defines a geographic region having a minimum length in a linear dimension that does not include one or more non-moveable objects located along the linear dimension;

determine a confidence value for each candidate landing zone based on movement of one or more moveable objects within the candidate landing zone observed over time between two or more images of the plurality of images;

for each candidate landing zone identified:

estimate a geographic position of the candidate landing zone based, at least in part, on the positioning data associated with images of the plurality of images from which the candidate landing zone was identified;

associate an identifier of the candidate landing zone with the geographic position estimated for the candidate landing zone and the confidence value to obtain candidate landing zone data; and store the candidate landing zone data in a database system of the storage machine;

receive, from a client computing device located on-board an unmanned aerial vehicle (UAV) over a wireless communications network, a request for a landing zone for the UAV, the request indicating a target geographic position or a target geographic region;

responsive to the request, select from among the two or more candidate landing zones, a target candidate landing zone from the candidate landing zone data stored in the database system based on the target geographic position or the target geographic region of the request; and send flight planning data that includes the geographic position estimated for the target candidate landing zone and the confidence value associated with the target candidate landing zone to the client computing device over the wireless communications network, wherein the client computing device executes a flight planning application that sets a flight plan for the UAV, based at least in part, on the geographic position and the confidence value of the flight planning data.

14. The computing system of claim 13, wherein the instructions are further executable by the logic machine to:

for each candidate landing zone identified:

identify a heading for the candidate landing zone that satisfies the minimum length in the linear dimension; and associate the heading with the identifier of the candidate landing zone within the candidate landing zone data stored in the database system; and for the target candidate landing zone, send the heading of the target candidate landing zone with the geographic position estimated for the target candidate landing zone to the client computing device over the wireless communications network.

15. The computing system of claim 13, wherein the instructions are further executable by the logic machine to select the target candidate landing zone at the computing system based, at least in part, on the confidence value determined for the target candidate landing zone.

16. The computing system of claim 13, wherein the instructions are further executable by the logic machine to:

for each candidate landing zone identified:

identify a candidate landing approach vector; and associate the candidate landing approach vector with the identifier of the candidate landing zone within the candidate landing zone data stored in the database system; and for the target candidate landing zone, send the candidate landing approach vector of the target candidate landing zone with the geographic position estimated for the target candidate landing zone to the client computing device over the wireless communications network.

17. The computing system of claim 13, wherein for each reporting aeronautical vehicle of the plurality of reporting aeronautical vehicles, the sensor data includes a position of the reporting aeronautical vehicle.

18. The computing system of claim 17, wherein for each reporting aeronautical vehicle of the plurality of reporting aeronautical vehicles, the sensor data further includes one or more of a heading of the reporting aeronautical vehicle, an altitude of the reporting aeronautical vehicle, a velocity of the reporting aeronautical vehicle.

19. The computing system of claim 17, wherein for each reporting aeronautical vehicle of the plurality of reporting aeronautical vehicles, the sensor data further includes a weather condition measured by a sensor on-board the reporting aeronautical vehicle.

20. A system, comprising:

a client computing device located on-board an unmanned aerial vehicle (UAV); and a computing system, comprising:

one or more computing devices that include a logic machine and a storage machine, wherein the storage machine includes instructions executable by the logic machine to:

receive sensor data that includes a plurality of images captured by a plurality of reporting aeronautical vehicles, wherein the sensor data associates the plurality of images with positioning data;

recognize and classify one or more objects within the plurality of images by a computer vision component of executed instructions in which each object recognized within the plurality of images is classified as a moveable object or a non-moveable object;

identify two or more candidate landing zones within the plurality of images in which each candidate landing zone defines a geographic region having a minimum length in a linear dimension that does not include one or more non-moveable objects located along the linear dimension;

determine a confidence value for each candidate landing zone based on movement of one or more moveable objects within the candidate landing zone observed over time between two or more images of the plurality of images;

for each candidate landing zone identified:

estimate a geographic position of the candidate landing zone based, at least in part, on the positioning data associated with images of the plurality of images from which the candidate landing zone was identified;

associate an identifier of the candidate landing zone with the geographic position estimated for the candidate landing zone and the confidence value to obtain candidate landing zone data; and store the candidate landing zone data in a database system of the storage machine;

receive, from the client computing device located onboard the UAV over a wireless communications network, a request for a landing zone for the UAV, the request indicating a target geographic position or a target geographic region;

responsive to the request, select from among the two or more candidate landing zones, a target candidate landing zone from the candidate landing zone data stored in the database system based on the target geographic position or the target geographic region of the request, and further based on the confidence value determined for the target candidate landing zone; and send flight planning data that includes the geographic position estimated for the target candidate landing zone and the confidence value associated with the target candidate landing zone to the client computing device over the wireless communications network, wherein the client computing device executes a flight planning application that sets a flight plan for the UAV, based at least in part, on the geographic position and the confidence value of the flight planning data.

* * * * *